(12) United States Patent
Cheriton (10) Patent No.: US 7,120,931 B1
(45) Date of Patent: Oct. 10, 2006

(54) SYSTEM AND METHOD FOR GENERATING FILTERS BASED ON ANALYZED FLOW DATA

(75) Inventor: David Cheriton, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 694 days.

(21) Appl. No.: 09/652,454

(22) Filed: Aug. 31, 2000

(51) Int. Cl.
G06F 9/00 (2006.01)
G06F 15/16 (2006.01)
G06F 17/00 (2006.01)

(52) U.S. Cl. .................... 726/13; 726/12; 713/152
(58) Field of Classification Search ............... 709/229, 709/233, 238, 240; 713/200, 201, 153, 154, 713/152; 370/235; 726/12, 13
See application file for complete search history.

(56) References Cited

U.S. PATENT DOCUMENTS

| | | | | |
|---|---|---|---|---|
| 5,774,668 A | * | 6/1998 | Choquier et al. | 709/223 |
| 5,848,233 A | * | 12/1998 | Radia et al. | 713/201 |
| 5,958,015 A | * | 9/1999 | Dascalu | 709/229 |
| 5,968,176 A | * | 10/1999 | Nessett et al. | 713/201 |
| 6,154,775 A | * | 11/2000 | Coss et al. | 709/225 |
| 6,222,856 B1 | * | 4/2001 | Krishnan et al. | 370/468 |
| 6,243,667 B1 | * | 6/2001 | Kerr et al. | 703/27 |
| 6,266,706 B1 | * | 7/2001 | Brodnik et al. | 709/242 |
| 6,321,338 B1 | * | 11/2001 | Porras et al. | 713/201 |
| 6,389,532 B1 | * | 5/2002 | Gupta et al. | 713/163 |
| 6,453,345 B1 | * | 9/2002 | Trcka et al. | 709/224 |
| 6,496,935 B1 | * | 12/2002 | Fink et al. | 713/201 |
| 6,510,509 B1 | * | 1/2003 | Chopra et al. | 712/13 |
| 6,542,508 B1 | * | 4/2003 | Lin | 370/395.43 |
| 6,550,012 B1 | * | 4/2003 | Villa et al. | 713/201 |
| 6,567,408 B1 | * | 5/2003 | Li et al. | 370/395.31 |
| 6,598,034 B1 | * | 7/2003 | Kloth | 706/47 |
| 6,625,150 B1 | * | 9/2003 | Yu | 370/389 |
| 6,651,099 B1 | * | 11/2003 | Dietz et al. | 709/224 |
| 6,667,985 B1 | * | 12/2003 | Drummond-Murray | 370/415 |
| 6,771,661 B1 | * | 8/2004 | Chawla et al. | 370/468 |
| 6,772,347 B1 | * | 8/2004 | Xie et al. | 713/201 |
| 6,804,820 B1 | * | 10/2004 | Meric et al. | 719/321 |
| 6,816,903 B1 | * | 11/2004 | Rakoshitz et al. | 709/226 |
| 2002/0023089 A1 | * | 2/2002 | Woo | 707/101 |
| 2002/0032793 A1 | * | 3/2002 | Malan et al. | 709/232 |
| 2002/0035628 A1 | * | 3/2002 | Gil et al. | 709/224 |
| 2002/0152209 A1 | * | 10/2002 | Merugu et al. | 707/7 |
| 2003/0023733 A1 | * | 1/2003 | Lingafelt et al. | 709/229 |
| 2003/0226038 A1 | * | 12/2003 | Raanan et al. | 713/201 |
| 2004/0215977 A1 | * | 10/2004 | Goodman et al. | 713/201 |

FOREIGN PATENT DOCUMENTS

EP 910197 A2 * 4/1999

(Continued)

OTHER PUBLICATIONS

Allied Telesyn, "Application Note 2037 Nemesis Firewall", May 2000.*

(Continued)

Primary Examiner—Jacques H. Louis Jacques
Assistant Examiner—Michael J. Simitoski
(74) Attorney, Agent, or Firm—Cindy Kaplan (57) ABSTRACT

A method and system for generating filters based on analyzed flow data are disclosed. A method generally comprises separating the data into different network flows, analyzing at least one of the network flows, and detecting potentially harmful network flows. A filter is generated to prevent packets corresponding to the detected potentially harmful network flows from passing through the network device.

31 Claims, 6 Drawing Sheets

FOREIGN PATENT DOCUMENTS

WO          WO 9724841 A2 *   7/1997

OTHER PUBLICATIONS

Apisdorf, Joel et al. "OC3MON: flexible, affordable, high performance statistics collection", Sep. 1996 (http://www.nlanr.net/NA/Oc3mon/).*
Cyberplaces Online Internet Workshop, "Firewalls" (http://www.cyberplaces.com/workshop/archive/0304982.htm).*
Decasper, Dan et al. "Router Plugins A Software Architecture for Next Generation Routers", 1998 ACM, pp. 229-240.*
Deering, S. et al. "Inernet Protocol, Version 6 (IPv6) Specification", Dec. 1998.*
Gupta, Pankaj et al. "Packet Classification on Multiple Fields", 1999 ACM, pp. 147-160.*
Ilvesmaki, Mika et al. "Adaptive Flow Classification in IP Switching—The Measurement Based Approach", 1998.*
Lakshman, T.V. et al. "High-Speed Policy-Based Packet Forwarding Using Efficient Multi-dimensional Range Matching", 1998 ACM, pp. 203-214.*
Newman, Peter et al. "Flow Labelled IP: A Connectionless Approach to ATM", 1996 IEEE.*
Frank, Jeremy. "Artificial Intelligence and Intrusion Detection: Current and Future Directions", Jun. 1994 in Proceedings of the 17th National Computer Security Conference.*
Neumann, Peter G. et al. "Experience with EMERALD to Date", Apr. 1999.*
Porras, Phillip A. et al. "Life Traffic Analysis of TCP/IP Gateways", Dec. 1997.*
Sekar, R. et al. "A High-Performance Network Intrusion Detection System", 1999.*
Valdes, Alfonso et al. "Adaptive, Model-based Monitoring for Cyber Attack Detection", 2000.*
Yoo, InSeon et al. "Adaptive Detection of Worms/Viruses In Firewalls", 2003.*
Bellovin, Steven M. "Distributed Firewalls", Nov. 1999.*
Buddhikot, Milind M. et al. "Space Decomposition Techniques for Fast Layer-4 Switching".*
Feldmann, Anja et al. "Tradeoffs for Packet Classification", 2000 IEEE.*
Network Associates. "The Active Firewall, The End of the Passive Firewall Era", 1999.*
Romig, Steve et al. "Cisco Flow Logs and Intrusion Detection at the Ohio State University", Dec. 1999, <http://web.archive.org/web/19980415195433/http://signal9.com/technical/prodsummary/fwsummary.html>.*
Signal9. "ConSeal PC Firewall Technical Summary", Apr. 1998, <http://web.archive.org/web/19980415195433/http://signal9.com/technical/prodsummary/fwsummary.html>.*
Smith, Robert N. et al. "Operating Firewalls Outside the LAN Perimeter", 1999 IEEE.*
Smith, Robert N. et al. "A Protocol and Simulation for Distributed Communicating Firewalls", 1999 IEEE.*
Smith, Robert N. et al. "Firewall Placement in a Large Network Topology", 1997 IEEE.*
Venkatesan, Ramkumar M. et al. "Threat-Adaptive Security Policy", 1997 IEEE.*
Fullmer, Mark et al. "The OSU Flow-tools Package and Cisco NetFlow Logs", LISA 2000, Dec. 2000, <http://www.usenix.org/events/lisa00/full_papers/fullmer/fullmer_html/>.*
Nvarro, John-Paul et al. "Combining Cisco NetFlow Exports with Relational Database Technology for Usage Statistics, Intrusion Detection, and Network Forensics", LISA 2000, Dec. 2000.*
Wang, Feiyi et al. "SITAR: A Scalable Intrusion-Tolerant Architecture for Distributed Services", 2001 IEEE.*

* cited by examiner

SYSTEM AND METHOD FOR GENERATING FILTERS BASED ON ANALYZED FLOW DATA

BACKGROUND OF THE INVENTION

The present invention relates generally to filtering data in high-speed computer networks, and more specifically, to the generation and refinement of filters.

In the connected world of the Internet, destructive individuals can create major network security problems for administrators with systems exposed to public networks. The recent denial of service attacks on many of the web's most popular sites makes this clearer than ever before. A denial of service attack occurs when a malicious attacker sends continuous TCP/IP packets to a server, which quickly take up resources until there are no more resources available and a system hang or crash occurs. Commonly the targeted site may appear unavailable to the broader Internet because of the saturation of its network segment. Denial of service attacks can result in significant loss of time and money for many organizations.

Denial of service attacks are different from most other attacks because they are not targeted at gaining access to a network or information on the network. These attacks focus on making a service unavailable for normal use, which may be accomplished by exhausting some resource limitation on the network or within an operating system or application. Denial of service attacks are most frequently executed against network connectivity. The goal is to prevent hosts or networks from communicating on the network. There are several types of denial of service attacks, which can occur at various levels. When involving specific network server applications, such as a Hypertext Transfer Protocol (HTTP) server or a File Transfer Protocol (FTP) server, these attacks can focus on acquiring and keeping open all of the available connections supported by that server, effectively locking out valid users of the server or service. Denial of service attacks can also be implemented using other Internet protocols, such as UDP and Internet Control Message Protocol (ICMP).

The most common denial of service attack is the SYN attack. This is a network level attack. The attacker sends continuous TCP SYN packets to a server. Each TCP SYN packet hangs the connection until there are no more TCP resources available. The attacker begins the process of establishing a connection to the victim machine, but does it in such a way as to prevent the ultimate completion of the connection. In the meantime, the victim machine has reserved one of a limited number of data structures required to complete the impending connection. The result is that legitimate connections are denied while the victim machine is waiting to complete phony "half-open" connections. This type of attack does not depend on the attacker being able to consume network bandwidth. The intruder may be consuming kernel data structures involved in establishing a network connection. The implication is that an intruder can execute this attack from a dial-up connection against a machine on a very fast network.

High-speed networks make detecting and responding to certain types of failures and attacks difficult. The high speed makes it difficult to carefully examine every packet or even maintain state and monitor the state of every data steam without extensive hardware support. For example, a 50 MPPS switch may receive over one million flow streams per second, producing a logging data rate of 20 megabytes per second with just a 20 byte record per flow. This rate of log data is expensive to store in hardware and practically impossible to process in software. Monitoring only a subset of the traffic results in holes in detection and provides no defense against problems that exceed this subset capacity.

A more common approach is to use aggregate traffic monitoring and policing. For example, a server switch may rate limit ICMP traffic arriving on an external port to a predetermined maximum rate rather than preclude it altogether. However, an attack or a failure using ICMP may use up the entire rate, effectively blocking out other ICMP traffic, with no mechanism to determine what is causing the problem. The offending or suspicious data is therefore hidden in the aggregate. Furthermore, a high-rate attack or failure can originate upstream of a device experiencing the problem, thus compromising use of the associated link even if the device can filter out the traffic.

SUMMARY OF THE INVENTION

A method and system for generating filters based on analyzed flow data are disclosed. A method generally comprises separating the data into different network flows, analyzing at least one of the network flows, and detecting potentially harmful network flows. A filter is generated to prevent packets corresponding to the detected potentially harmful network flows from passing through the network device.

In another aspect of the invention a method for propagating filters to an upstream device comprises generating a filter at a first network device, sending information on the filter to a second network device located upstream from the first network device, and requesting the second network device to install the filter.

A computer program product for generating filters based on analyzed network flows generally comprises code that analyzes the network flow and code that detects potentially harmful network flows. The product further comprises code that automatically generates a filter to prevent packets corresponding to the detected potentially harmful network flows from passing through the network device and a computer readable storage medium for storing the codes.

A system of the present invention for automatically generating filters based on data entering a network device generally comprises a netflow device operable to receive streams of packets, separate the streams, and create a summary record containing information on each of the streams, and a flow analyzer operable to analyze the record and identify potentially harmful network flows. The system further includes a filter generator operable to generate a filter to prevent packets corresponding to the identified potentially harmful network flows from passing through the network device.

In another aspect of the invention a system generally comprises means for separating the data into different network flows, means for analyzing at least one of the network flows, means for detecting potentially harmful network flows, and means for generating a filter to prevent packets corresponding to the detected potentially harmful network flows from passing through the network device.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 1:
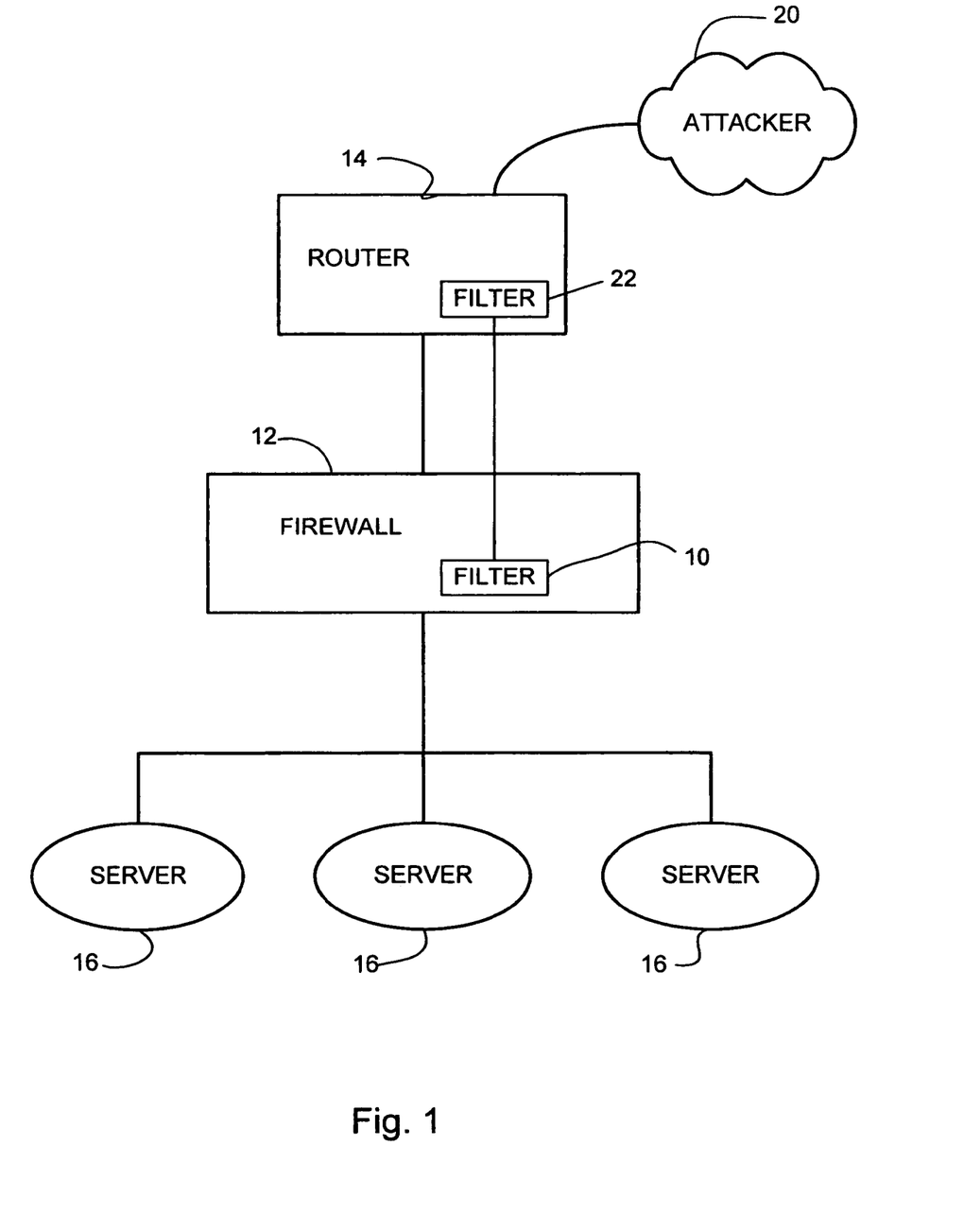
FIG. 1 is a diagram illustrating a firewall located between a router and a plurality of servers with an attacker sending data into the router.

Referring now to the drawings, and first to FIG. 1, a filter 10 is shown inserted into a firewall 12 located between a router 14 and a plurality of servers 16. An attacker 20 is shown positioned to transmit harmful packets to the router 14. A system and method of the present invention utilize a combination of aggregate filters 10 and a mechanism such as a netflow directory of microflows to automatically and progressively refine the aggregate filters to identify detailed characteristics of packets involved in an attack or a failure. The system is used to detect harmful network flows which may include denial of service attacks or merely a high rate of data coming into the system which needs to be filtered to reduce the possibility of problems within the network. As described below, the system may also use an inter-router filter propagation protocol (FPP) to automatically propagate filter information upstream to filter data closer to the source of the data, as illustrated by filter 22 located at router 14.

The present invention operates in the context of a data communication network including multiple network elements. Some of the nodes in a network that employs the present invention may be network devices such as routers and switches. For example, some of the nodes may be specially configured routers such as those available from Cisco Systems, Inc. of San Jose, Calif. As used herein the term router is used to refer to devices that forward packets based on network and higher layer information. The router may include, for example, a master central processing unit (CPU), interfaces, and a bus (e.g., a PCI bus). The CPU preferably includes a memory and a processor. When acting under the control of appropriate software or firmware, the CPU is responsible for such router tasks as routing table computations, network management, and general processing of packets. It preferably accomplishes all of these functions under the control of software including an operating system (e.g., a version of the Internetwork Operating System (IOS®) of Cisco Systems, Inc.) and any appropriate applications software. The CPU may include one or more processors such as a processor from the Motorola family or microprocessors of the MIPS family of microprocessors. In an alternative embodiment, the processor is specially designed hardware for controlling operations of the router. Memory can be non-volatile RAM and/or ROM. However, there are many different ways in which memory may be coupled to the system. In an alternative embodiment, a router or switch may be implemented on a general purpose network host machine such as the computer system shown in the block diagram of FIG. 2.

Figure 2:
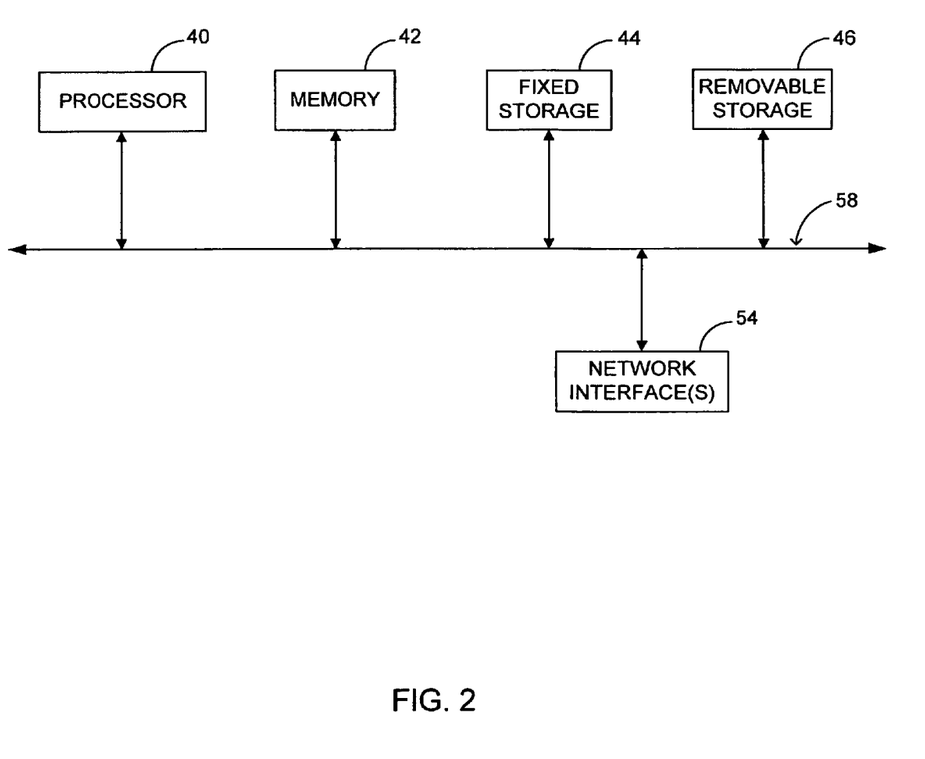
FIG. 2 is a diagram illustrating a logical architecture of a computer system that may be used to execute software of this invention.

FIG. 2 shows a system block diagram of a computer system that may be used to execute software of an embodiment of the invention. The computer system may include subsystems such as a central processor 40, system memory 42, removable storage 46 (e.g., CD-ROM drive), and a hard drive 44 which can be utilized to store and retrieve software programs incorporating computer code that implements aspects of the invention, data for use with the invention, and the like. The computer readable storage may also include tape, flash memory, or system memory. Additionally, a carrier wave (e.g., in a network including the Internet) may be a transmission medium. The computer system may further include a display screen, keyboard, and mouse which may include one or more buttons for interacting with a GUI (Graphical User Interface). Other computer systems suitable for use with the invention may include additional or fewer subsystems. For example, the computer system may include more than one processor 40 (i.e., a multi-processor system) or a cache memory.

The system bus architecture of the computer system is represented by arrows 58 in FIG. 2. However, these arrows are only illustrative of one possible interconnection scheme serving to link the subsystems. For example, a local bus may be utilized to connect the central processor 40 to the system memory 42. The components shown and described herein are those typically found in most general and special purpose computers and are intended to be representative of this broad category of data processors. The computer system shown in FIG. 2 is only one example of a computer system suitable for use with the invention. Other computer architectures having different configurations of subsystems may also be utilized.

Communication between computers within the network is made possible with the use of communication protocols, which govern how computers exchange information over a network. The computer may include an input/output circuit used to communicate information in appropriately structured form to and from the parts of computer and associated equipment. Connected to the input/output circuit are inside and outside high speed Local Area Network interfaces, for example. The inside interface will be connected to a private network, while the outside interface will be connected to an external network such as the Internet. Preferably, each of these interfaces includes a plurality of ports appropriate for communication with the appropriate media, and associated logic, and in some instances memory. The associated logic may control such communication intensive tasks as packet integrity checking and media control and management. The high speed interfaces are preferably multiport Ethernet interfaces, but may be other appropriate interfaces such as FDDI interfaces.

Referring again to FIG. 1, the firewall 12 is located between the router 14 and the plurality of servers 16. The router 14 may be an Internet Service Provider (ISP) router, for example. It is to be understood that the system and method of the present invention may also be used in networks which are not connected to the Internet.

The firewall 12 is a system or group of systems that enforce a security policy between an organization's network and the Internet. The firewall 12 determines which inside services may be accessed from the outside, which outsiders are permitted access to the inside services, and which outside services may be accessed by insiders. For the firewall 12 to be effective, all traffic to and from the Internet must pass through the firewall, where it can be inspected. The firewall 12 permits only authorized traffic to pass, thus providing a perimeter form of defense for securing network access. The firewall 12 may be configured, for example, to allow specific IP source addresses to access specific IP destination addresses, or only allow HTTP packets and not allow TELNET or FTP. The firewall 12 is preferably a packet filtering firewall but may also be a proxy (application) firewall.

Figure 3:
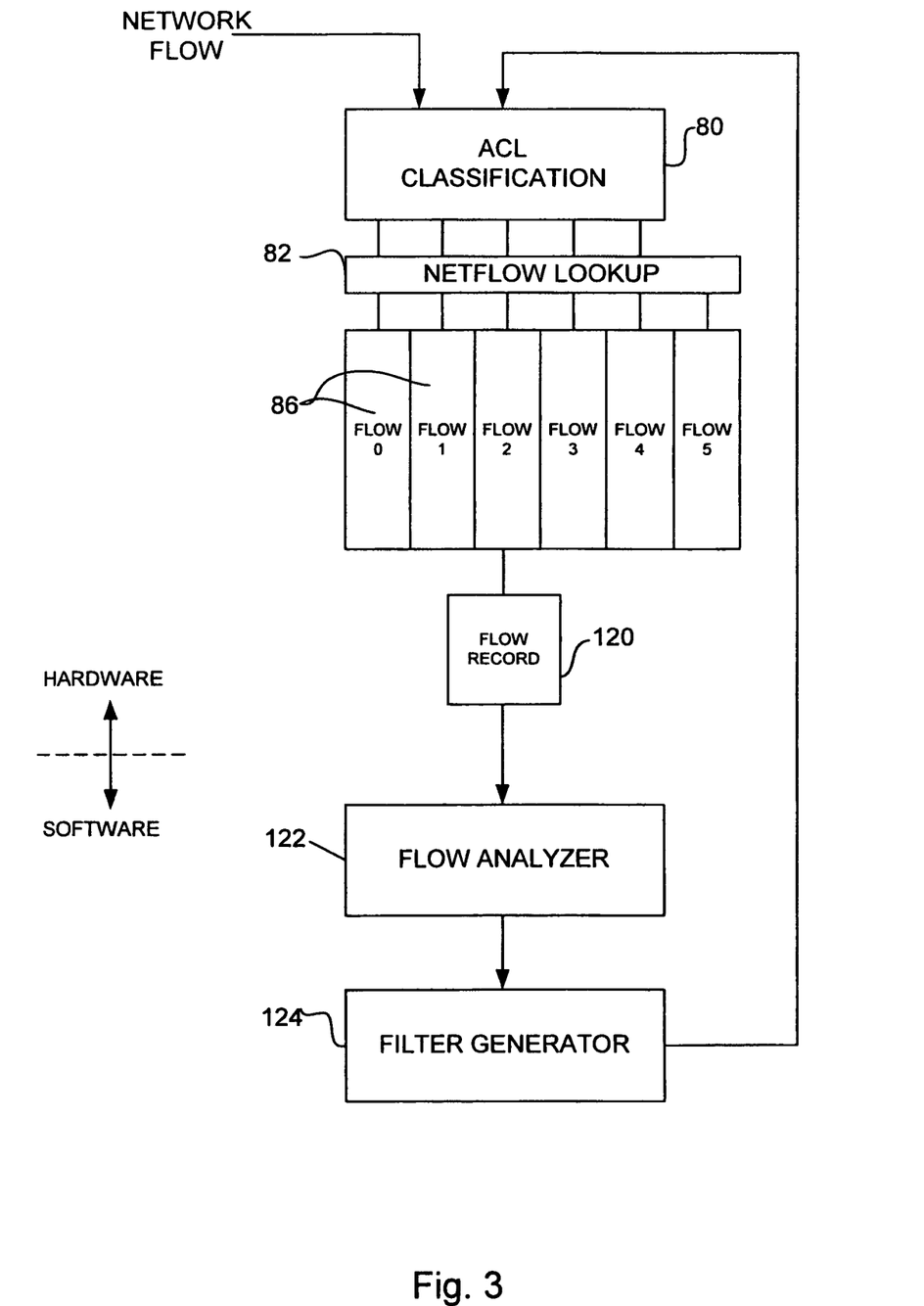
FIG. 3 is a diagram illustrating a system of the present invention for analyzing data transmitted to the firewall of FIG. 1 and generating a filter for the firewall.

FIG. 3 illustrates a netflow directory of microflows which are used to analyze the high speed data entering the router 14 or firewall 12 to identify detailed characteristics of packets involved in an attack or a failure. The netflow mechanism is configured to create network flows for those matching specified aggregate filters as described below. Also included is a means for determining the specific flows created by the netflow mechanism and the aggregate filter responsible for the creation of each specific flow. The netflow mechanism may be, for example, a network flow switching and flow data export system such as disclosed in U.S. patent application Ser. No. 08/886,900, filed Jul. 2, 1997, which is incorporated herein by reference in its entirety.

Figure 4:
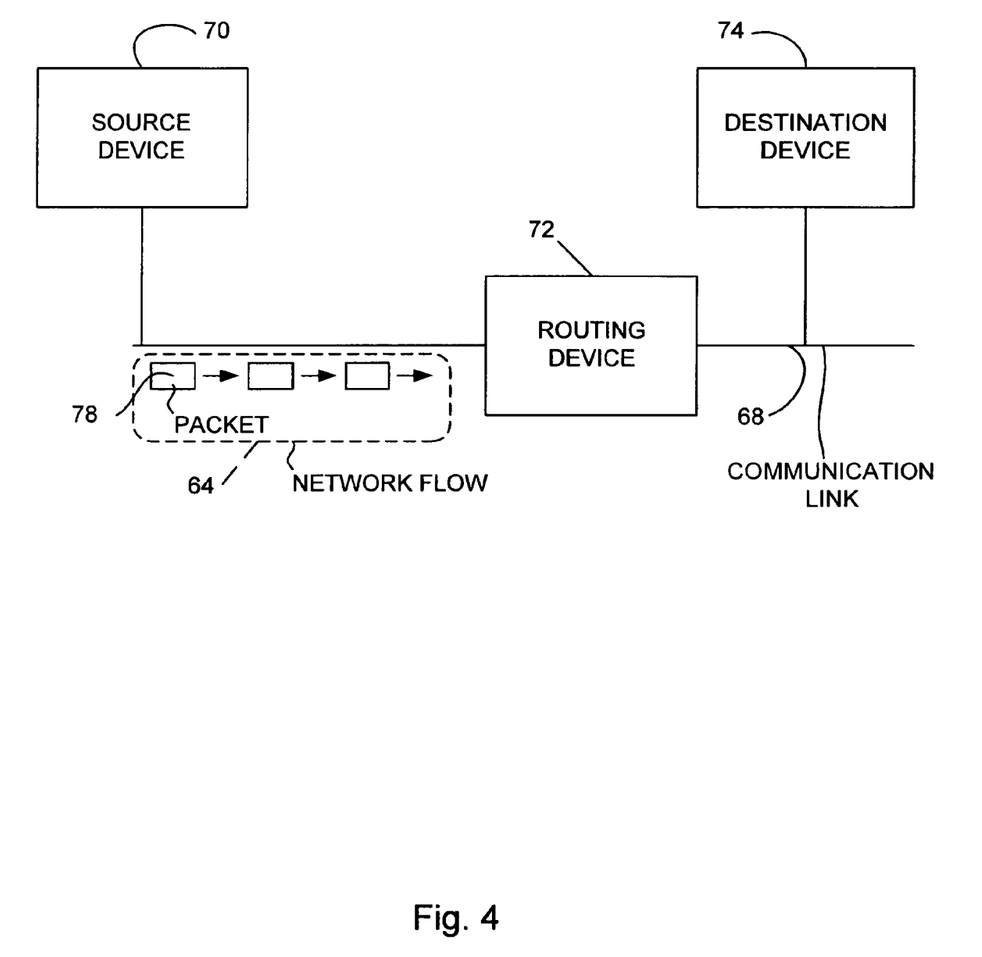
FIG. 4 is a diagram of a network illustrating network flow on a communication link.

FIG. 4 shows a network flow 64 on communication link 68 connecting a source device 70, a routing device 72 and a destination device 74. The network flow 64 consists of a unidirectional stream of packets 78 to be transmitted between pairs of transport service access points. The network flow 64 thus, broadly refers to a logical communication circuit between communication endpoints. The source device 70 may be the attacker 20, the routing device may be the ISP router 14 or firewall 12, and the destination device may be one of the plurality of servers 16 shown in FIG. 1. The communication link 68 may comprise any form of physical media layer such as Ethernet, FDDI, or HDLC serial link. The routing device 72 may include specific hardware constructed or programmed for performing process steps described below, a general purpose processor operating under program control, or some combination thereof.

Data is received from the source device 70 in network flow 64 which is defined by a network layer address for the source device, a port number at the source device, a network layer address for the destination device 74, a port number at the destination device, and a transmission protocol. For example, HTTP (Hypertext Transfer Protocol) web packets from a particular source host to a particular destination host constitute a separate flow from FTP (File Transfer Protocol) file transfer packets between the same pair of hosts. The transmission protocol type may identify a known transmission protocol, such as UDP, TCP, ICMP, or IGMP (Internet Group Management Protocol). The source device 70 may be identified by its IP (Internet Protocol) address, for example. The port number at the source device is identified by either a port number which is specific to a particular process, or by a standard port number for the particular transmission protocol type.

As shown in FIG. 3, packets 78 within the network flow 64 are first sent to an ACL (Access Control List) classification device 80. The ACL classification device 80 is configured to classify the received packets 78. The flow may be classified, for example, by source node (IP address), destination node (IP address), detail destination node (destination address, source TCP/UDP port, destination TCP/UDP port, protocol), host matrix (source address/destination address pair), detail host matrix (source/destination address, port, protocol), source TCP/UDP (transportation layer source port), destination TCP/UDP port (transport layer destination port), protocol (protocol name), detail interface (input-output physical interface pair), or some combination thereof.

Security (ACL) processing may be applied only to the first packet 78 of a network flow 64. For example, the ACL processing may determine whether or not to build a netflow entry on the first packet, and subsequent packets may bypass the ACL processing. Information from the first packet 78 is used to build an entry in a netflow cache. Subsequent packets in the flow are handled via a single streamlined task that handles data collection. After packets 78 pass through the ACL classification device 80, the packets are sent to a netflow lookup device 82 which separates the streams into a plurality of flows (or bucket) 86. Each bucket includes a linked list of entries which include information about a particular network flow 64. The netflow mechanism maintains the flow cache by removing entries for network flows which are inactive or no longer considered valid.

Figure 5:
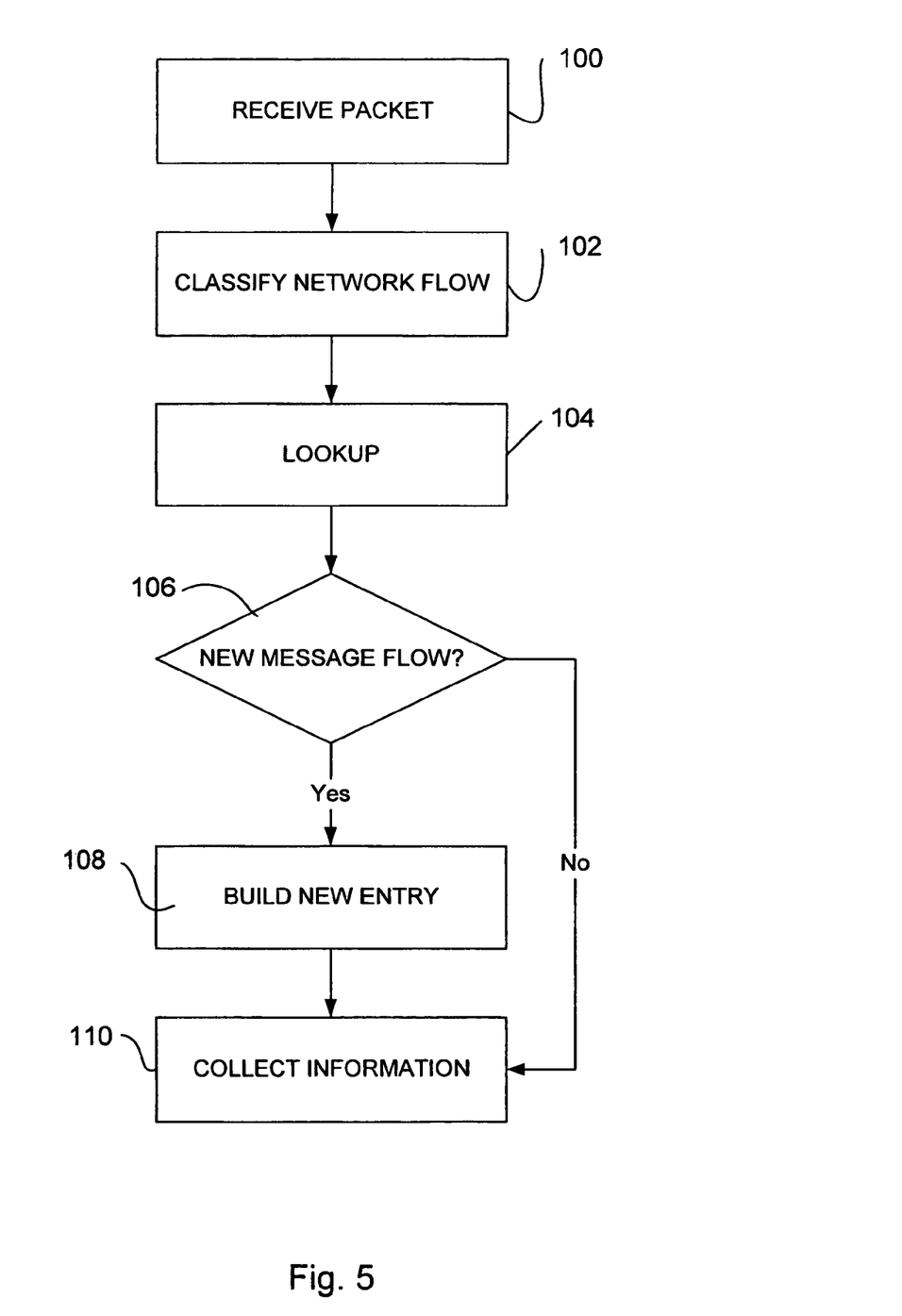
FIG. 5 is a flowchart illustrating a process for classifying and analyzing network flows in a netflow directory.

FIG. 5 is a flowchart illustrating a process for analyzing packets utilizing the netflow directory. A packet 78 is first received at the ACL classifier 80 (step 100). The ACL classifier 80 may examine a header of the packet 78 and identify the IP address for the source device, the IP address for the destination device, and the protocol type for the packet, for example, to classify the packet (step 102). The ACL classifier 80 then selects a flow column 86 for the network flow 64. Based on the results of the classification, the netflow lookup device 82 may perform a lookup in the flow cache for the identified network flow (step 104). If the lookup is unsuccessful, the identified network flow 64 is a new network flow and the netflow mechanism may build a new entry in the flow cache (step 106). The proper treatment of packets in the network flow is determined, for example, from the classification (steps 106 and 108). The netflow mechanism then proceeds at step 110, using the information from the new entry in the flow cache, just as if the identified network flow were an old network flow. If the lookup is successful, the identified network flow 64 is an old network flow and the lookup device 82 continues with step 110. Since the netflow mechanism processes each packet 78 in the network flow 64 responsive to the entry for the network flow in the flow cache, the netflow mechanism is able to implement administrative policies which are designated for each network flow rather than for each packet. Thus, the network flows are analyzed and information on incoming packets is provided without examining each packet received. This flow collection aggregation allows for data to be stored by aggregate summary records instead of raw data records.

Once the flow 64 passes through the netflow directory, flow records 120 are created that provide information about a particular network flow (FIG. 3). The flow record 120 may include, for example, information about packets 78 in particular network flows 64, including source address, port number, and protocol type, or other information relevant to diagnosing actual or potential network problems including attacks on the network. Since the amount of information from the high speed data is reduced in hardware by the netflow mechanism to a reasonable amount of data, the flow records 120 can now be analyzed by software. The flow records 120 are sent to a flow analyzer 122 where the flows are analyzed to identify characteristics of packets 78 involved in an attack or a failure. For example, if a large number of SYN packets or an unusual distribution of packets is identified as coming from a source (e.g., attacker 20), it is likely that the source is involved in an attack. The attacker may first be identified as an organization such as a university, business, or an ISP, for example. However, it is likely that there is only one source within the organization that is sending harmful packets. Once a group of packets 78 are identified as harmful, the corresponding network flows 64 can be analyzed to further refine the filter. Therefore, instead of filtering out all data arriving from the identified organization, only the destructive packets received from the actual attacker are dropped.

Figure 6:
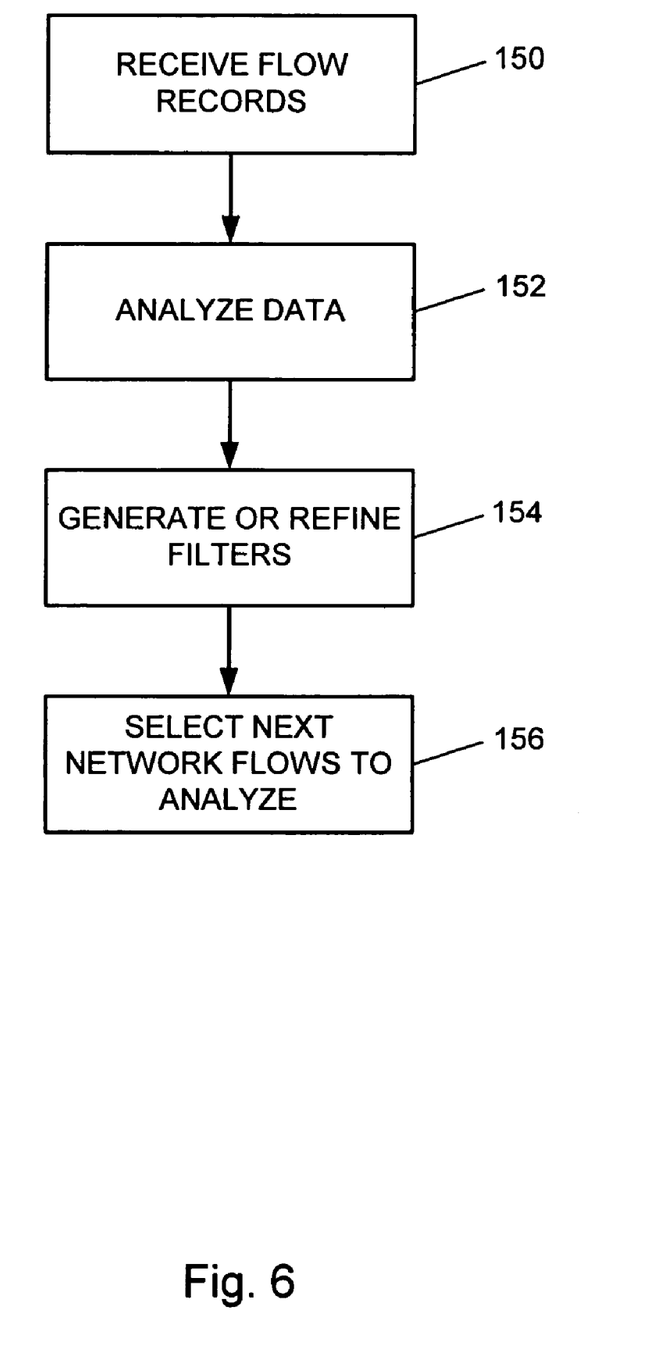
FIG. 6 is a flowchart illustrating a process of the present invention for refining filters to identify characteristics of packets involved in an attack or failure.

FIG. 6 is a flowchart illustrating a process performed by the flow analyzer 122 and flow generator 124. The flow records 120 are first received by the flow analyzer 122 at step 150. The flow analyzer 122 then analyzes data received at step 152. The filter generator 124 next generates or refines filters (step 154). The filter generator 124 then selects the next group of network flows to be analyzed and passes this information to the ACL classifier 80 (step 156).

The initial class of packets 78 to be analyzed is selected based on statistics associated with the aggregate filters, as described below. The data which is to be analyzed is periodically changed or updated to further refine a filter once it has been generated. For example, a first class of packets 78 may be analyzed for 0.5 second then a next class of packets analyzed for the next 0.5 seconds. The initial filters 10 may be configured according to user specified configurations or default values. The flow analyzer 122 and filter generator 124 then use the analyzed flow to determine if the existing filters need to be refined or new filters need to be generated. Based on the analyzed flow, the filter generator 124 will tell (or modify) the ACL classifier 80, which then affects the netflow entries that are created. The class of packets 78 selected may be based on a class of packets which have been identified as potentially harmful, or may be randomly chosen. The ACL classifier 80 may, for example, begin by looking at flows 64 for all packets 78 received from a source with an IP address having the form 3.xxx.xxx.xxx, where xxx represents any possible value from zero to 255. If a problem is identified in one of the packets streams 64, the ACL classifier 80 may be then instructed to look at flows for all packets 78 received from a source having an IP address of 3.141.xxx.xxx. This may be narrowed down further to refine the filter 10.

The flow analyzer 122 monitors the statistics associated with these aggregate filters 10. If the statistics associated with an aggregate filter entry indicate a potential problem (or just as a periodic check of the traffic distribution), creation of netflow entries is enabled for packets matching this entry. Consequently, the flow analyzer 122 receives a flow record 120 for each flow matching this aggregate. Using this specific flow information, the flow generator 124 determines how to refine the aggregate filter. For example, the flow label information may indicate that most ICMP packets are coming from a particular source address. In this case, the flow generator 124 can configure an aggregate filter 10 that matches ICMP packets from that source, establishing a separate policer for that filter or potentially just blocking the source. The original aggregate filter is preferably retained as well so that all other ICMP traffic matches to this original filter. The flow analyzer 122 can then monitor the statistics of the original aggregate filter with the offending host removed, to detect whether there are further anomalies within the aggregate flow.

The flow analyzer 122 may also be configured to recognize that the total rate of traffic matching an aggregate value may far exceed its ability to sample by examining the statistics for the entry. For example, the total port traffic into a web server may be too much to handle. In this case, the aggregate filters can be split into multiple subaggregates based on some quasi-random distinction. It may use, for example, four aggregate filters that select different traffic based on the lower-order two bits of the IP source address for the packets 78. The flow analyzer 122 then samples using the netflow directory for each of the four aggregate filters in sequence.

The filters 10 may be refined to recognize either that the rate of packets 78 itself is a problem or else allow these packets to be redirected to the flow analyzer 122 for more careful examination, such as to identify specific aspects of an attack or failure. When such examination is in use, the filters 10 can employ a rate-limiting policer to prevent software from being overwhelmed.

The system shown in FIG. 3 may also be used to automatically recognize further structure to network traffic that does not necessarily represent an attack or a failure. For example, a web server may receive an excessive level of traffic from a search engine spider or an upstream web cache. By automatically detecting a high demand source of this nature, the filter generator 124 can automatically reconfigure the filters 10 to handle this demand. For example, a policy may indicate a maximum aggregate rate of HTTP traffic of 100 Mpbs and a maximum rate from any source of 25 Mbps. Rather than explicitly policing every flow, the system can be used to identify sources that appear to represent excessive traffic, allowing aggregate filters to be created that separate them out of the overall aggregate and throttle their traffic appropriately. These filters 10 can also be automatically removed when the associated traffic drops off, based on the statistics associated with the identified flow. Thus, for example, once a search engine finishes its searching at a web site, the filter 10 created for it indicates that traffic has dropped because of the lower rate and the specific filter can be reclaimed.

Once the initial filters 10 are defined within the firewall 12, the system may be used to automatically propagate filter information upstream to filter data closer to the source, such as filter 22 located at router 14 shown in FIG. 1. For example, an enterprise switch may identify excessive traffic as coming from a particular source subnet or host and communicate this upstream to a router, requesting this router to automatically install a filter for this traffic. The filter 22 prevents the excessive traffic from monopolizing a potentially slower tail circuit to the enterprise, just to be discarded at that point. This filter 22 can also be automatically removed, as previously described with respect to the filter 10 located at the firewall 12. The downstream device is able to receive statistics from the upstream device for a specific filter that it requested, determine that the traffic requiring the filter is no longer present, and remove this upstream filter. An inter-switch/router filter propagation protocol (FPP) is used to create, remove, monitor, and modify filters 10, 22 between devices. FPP uses negative routing (i.e., it indicates what traffic not to forward). An upstream node receives the negative routing information from a downstream node and then refines the filter and puts it in a place such that it only affects traffic that it would forward to the requesting downstream node. That is, a node can not request filtering of traffic to other nodes. The upstream node maintains a packet and byte count of packets received that match the filter and are thus dropped. FPP provides an operation to request these statistics from the upstream node and optionally extend the lifetime of the filter. A filter is removed after a specified time period during which a downstream node has not requested extension of this filter or the downstream node explicitly requests removal of the filter. FPP preferably follows the type-length-value (TLV) structure of protocols such as BGP, and is designed to run over TCP, for example. It is to be understood that other transports and representation may be used for FPP without departing from the scope of the invention.

An upstream device can limit the filters that a downstream device can specify using this FPP to those affecting the traffic that the downstream device is to receive, based on local routing information. The upstream device can further limit the total number of such filters a downstream device can request, encouraging the downstream device to use this limited resource effectively. It can also refine these filters to match just that traffic destined for the requesting downstream device. For example, a downstream device on subnet 171.172.X.X. can request a filter on HTTP traffic from source network 36.131.X.X. The upstream device can enter the filter to match on SA 36.131.X.X. and DA 171.172.X.X so that the filter (policer) does not affect traffic from this source to other subnets connecting to the same upstream device. It can also require the downstream device to actively subscribe to each such filter, so that the upstream device can reclaim these filters easily if the downstream node reboots and forgets the requested filter information.

By using filters in several different devices (e.g., switches, routers) effectively pushing back upstream towards the sources, the total number of filters available to react against an attack can be substantially more than that supported by a single device. This multi-hop filter propagation also has the benefit of allowing an ISP router, for example, to automatically block the traffic at a peering point that is simply going to be dropped, rather than transporting it across the ISPs backbone just to be dropped. The peering ISP can then back-propagate these filters itself to drop the traffic sooner, and in the extreme, use it as a basis to shut down or investigate an offending source.

Reverse path forwarding (RPF) may be used to attempt to prevent source spoofing. Effective filtering of attackers depends on the prevention of the attacker from spoofing other source addresses that are not registered for use by this attacking node. RPF check can be used to detect and drop packets corresponding to source spoofing provided that the routing topology is restricted, such as largely hierarchical. RPF check may be used in cases where attacks and failures are a concern, with certain network topologies being preferred or avoided to make this as enforceable as possible. That is, configurations where traffic can simultaneously arrive at a switch from a given source from multiple input ports or VLANs is avoided. RPF is an input function applied on the input interface of a router at the upstream end of a connection. RPF checks to see if any packet received at a router interface arrives on one of the best return paths to the source of the packet. RPF does a reverse lookup in a forwarding table. If the packet was received from one the best reverse path routes, the packet is forwarded as normal. If there is no reverse path route on the same interface from which the packet was received, the source address may have been modified or forged.

Assuming that RPF checking is deployed, the automatic progressive filter refinement can respond automatically to denial of service attacks allowing the sites to effectively respond in seconds or less, rather than hours, even with a distributed denial of service attack. The attacking sources can be quickly identified and filters propagated on this traffic upstream and locally. The filter can be adapted to new sources as the attack moves.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for generating filters based on data entering a network device, comprising:
   separating the data into a plurality of network flows;
   creating separate aggregate network flow summaries for each of said network flows;
   sending at least one of said aggregate network flow summaries to a flow analyzer at the network device;
   analyzing said at least one aggregate network flow summary to detect characteristics of potentially harmful network flows;
   generating or refining a filter based on said analyzed aggregate network flow summary to prevent packets corresponding to detected potentially harmful network flows from passing through said network device; and
   selecting a new aggregate network flow summary to analyze and sending the selected aggregate network flow summary to the flow analyzer for analysis, wherein the new aggregate flow summary corresponds to a network flow associated with the generated or refined filter.

2. The method of claim 1 further comprising classifying network flow based on a source device sending a packet.

3. The method of claim 2 wherein the network flow is classified based on an IP address of the source device.

4. The method of claim 1 wherein analyzing said at least one aggregate network flow summary comprises monitoring statistics associated with said network flows.

5. The method of claim 1 further comprising propagating the generated filter to an upstream network device.

6. The method of claim 1 further comprising sending each of said plurality of network flows to a corresponding flow cache and implementing policies designated for each of said network flows.

7. The method of claim 6 wherein sending each of said plurality of network flows is performed by hardware and analyzing said at least one aggregate network flow summary is performed by software.

8. The method of claim 1 wherein analyzing said at least one aggregate network flow summary comprises utilizing software.

9. The method of claim 1 wherein selecting a new aggregate network flow summary to analyze comprises selecting a class of said network flows to analyze based on previously analyzed network flows.

10. The method of claim 1 wherein detecting potentially harmful network flows comprises identifying a source address associated with said harmful network flow and generating a filter comprises generating a filter to prevent packets from said identified source from passing through said network device.

11. The method of claim 1 wherein information resulting from analyzing at least one of said aggregate network flow summaries is reduced in hardware so that flow records can be analyzed by software.

12. The method of claim 1 wherein a group of potentially harmful packets is detected and further comprising analyzing said corresponding network flow and further refining said filter.

13. The method of claim 1 further comprising selecting a group of network flows to be analyzed.

14. The method of claim 13 further comprising passing information on the selected group of network flows to a classifier.

15. The method of claim 1 wherein a class of packets to be analyzed is selected based on statistics associated with the generated or refined filter.

16. The method of claim 1 further comprising splitting said filters if traffic into said filter exceeds a sampling capability of the filter.

17. The method of claim 1 wherein analyzing said aggregate network flow summary comprises analyzing for a specified interval of time.

18. A computer program product for generating filters based on analyzed network flows, comprising:
   code that separates data into different network flows;
   code that creates an aggregate network flow summary for one or more of said network flows;
   code that selects one or more network flows for analysis;
   code that sends said selected aggregate network flow summaries to a flow analyzer at the network device;
   code that analyzes said selected network flows by reviewing said aggregate network flow summaries;
   code that detects potentially harmful network flows;
   code that automatically generates or refines a filter based on said analyzed network flow summary to prevent packets corresponding to said detected potentially harmful network flows from passing through the network device;
   code that selects a new aggregate network flow summary to analyze and send the selected aggregate network flow summary to the flow analyzer for analysis; and
   a computer-readable storage for storing the codes executable by a processor.

19. The computer program product of claim 18 further comprising code that propagates said filter to an upstream network device.

20. The computer program product of claim 18 further comprising code that refines said filter based on said analyzed network flow.

21. A system for automatically generating filters based on data entering a network device, comprising:
   a netflow device operable to receive streams of packets, separate said streams, and create a summary record containing information on each of said streams;
   a flow analyzer located at the network device and operable to receive said summary records from said netflow device and analyze said summary records and identify potentially harmful network flows; and
   a filter generator operable to generate or refine a filter based on analyzed summary records to prevent packets corresponding to said identified potentially harmful network flows from passing through the network device, wherein said netflow device is operable to create a new summary record containing information on a stream of data associated with said generated or refined filter.

22. The system of claim 21 wherein the network device comprises hardware and the flow analyzer and filter generator comprise software.

23. The system of claim 21 wherein the network device comprises an ACL classifier, a lookup device, and a plurality of flow buckets.

24. The system of claim 21 further comprising a filter propagator operable to send information on said filters to an upstream device and request the upstream device to create a corresponding filter.

25. The system of claim 21 further comprising a netflow directory comprising a plurality of flow cache entries and configured to build new flow cache entries for network flows without a corresponding flow cache entry.

26. The system of claim 21 further comprising a classifier operable to classify said streams of packets based on one or more packets received at the netflow device.

27. A method for generating filters for network flow, comprising:
   receiving data at a network device;
   classifying network flows based on one or more packets received at the network device;
   analyzing one or more of said network flows;
   generating a filter for one or more of said network flows;
   processing each of said network flows according to a corresponding policy;
   selecting a class of network flows to analyze;
   analyzing said selected class of network flows; and
   refining said filter for said selected class of network flows, wherein refining said filter comprises modifying the classification of network flows.

28. The method of claim 27 wherein each of said filters are generated specifically for a corresponding network flow.

29. An apparatus for generating filters based on analyzed network flows, the apparatus comprising:
   one or more processors; and
   a memory that stores instructions to be executed by said one or more processors, said instructions comprising:
      code that creates separate aggregate network flow summaries for each of said network flows;
      code that sends at least one of said aggregate network flow summaries to a flow analyzer at the network device;
      code that analyzes said at least one aggregate network flow summary to detect characteristics of potentially harmful network flows;
      code that generates or refines a filter based on said analyzed aggregate network flow summary to prevent packets corresponding to detected potentially harmful network flows from passing through said network device; and
      code that selects a new aggregate network flow summary to analyze and sending the selected aggregate network flow summary to the flow analyzer for analysis, wherein the new aggregate flow summary corresponds to a network flow associated with the generated or refined filter.

30. The apparatus of claim 29 wherein said instructions further comprise code that propagates said filter to an upstream network device.

31. The apparatus of claim 29 wherein said instructions further comprise code that classifies network flow based on a source device sending a packet.

* * * * *